(12) United States Patent
Tseng et al.

(10) Patent No.: US 10,069,634 B2
(45) Date of Patent: Sep. 4, 2018

(54) APPARATUSES AND METHODS FOR CERTIFICATE GENERATION, CERTIFICATE REVOCATION AND CERTIFICATE VERIFICATION

(71) Applicant: Industrial Technology Research Institute, Hsinchu (TW)

(72) Inventors: Huei-Ru Tseng, New Taipei (TW); Pei-Chuan Tsai, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 182 days.

(21) Appl. No.: 14/623,499

(22) Filed: Feb. 17, 2015

(65) Prior Publication Data
US 2015/0256347 A1    Sep. 10, 2015

(30) Foreign Application Priority Data
Mar. 5, 2014  (TW) .............................. 103107517 A

(51) Int. Cl.
*H04L 29/06* (2006.01)
*H04L 9/32* (2006.01)
*H04L 9/08* (2006.01)

(52) U.S. Cl.
CPC .......... *H04L 9/3268* (2013.01); *H04L 9/0861* (2013.01); *H04L 9/3236* (2013.01); *H04L 9/3265* (2013.01); *H04L 63/0823* (2013.01)

(58) Field of Classification Search
CPC .................................................. H04L 9/3268
See application file for complete search history.

(56) References Cited

U.S. PATENT DOCUMENTS 6,097,811 A    8/2000  Micali
6,397,329 B1 *  5/2002  Aiello ................... G06F 9/4411
                                          710/8
(Continued)

FOREIGN PATENT DOCUMENTS

| TW | 200805982 | 1/2008 |
| TW | 201412075 | 3/2014 |
| WO | 2006026737 | 3/2006 |

OTHER PUBLICATIONS

Paul Kocher, "On Certificate Revocation and Validation," Financial Cryptography, Internatinonal Conference, Jan. 1, 1998, pp. 172-177.

(Continued)

*Primary Examiner* — Mahfuzur Rahman
*Assistant Examiner* — Darshan Dhruv
(74) *Attorney, Agent, or Firm* — JCIPRNET

(57) ABSTRACT

Apparatuses and methods for certificate generation, certificate revocation and certificate verification are provided. The certificate generation and revocation apparatus includes: a key set computation unit receiving a secret value and a hash function set and generating a key set of an entity; a hash function unit generating the hash function set; a certificate generation unit generating certificates corresponding to the public/private key pairs and the key set; a certificate revocation unit acquiring derived secret key corresponding to a revoked certificate set and updating a certificate revocation list; and a certificate revocation list broadcast unit broadcasting the certificate revocation list; wherein the secret value corresponds to a root of a key tree, wherein the key set is generated by leaves of the key tree, wherein each node of the key tree is generated by a randomly selected hash function.

17 Claims, 7 Drawing Sheets

(56) References Cited

U.S. PATENT DOCUMENTS

| | | | |
|---|---|---|---|
| 7,373,503 B2 * | 5/2008 | Nakano | G11B 20/00086 713/158 |
| 7,404,080 B2 | 7/2008 | Jakobsson | |
| 7,571,228 B2 | 8/2009 | Classen et al. | |
| 8,015,597 B2 | 9/2011 | Libin et al. | |
| 8,090,949 B2 | 1/2012 | Bellur et al. | |
| 8,171,283 B2 | 5/2012 | Pietrowicz et al. | |
| 8,230,215 B2 | 7/2012 | Laberteaux et al. | |
| 2002/0152387 A1 * | 10/2002 | Asano | G11B 20/00086 713/176 |
| 2003/0217265 A1 * | 11/2003 | Nakano | G11B 20/00086 713/158 |
| 2006/0059333 A1 * | 3/2006 | Gentry | H04L 9/3236 713/156 |
| 2006/0129805 A1 * | 6/2006 | Kim | H04L 9/0822 713/158 |
| 2007/0074036 A1 * | 3/2007 | Ramzan | G06F 21/33 713/176 |
| 2007/0168659 A1 * | 7/2007 | Gentry | H04L 9/0822 713/158 |
| 2007/0174609 A1 | 7/2007 | Han et al. | |
| 2007/0185814 A1 | 8/2007 | Boccon-Gibod et al. | |
| 2010/0025466 A1 * | 2/2010 | Cardone | H04L 9/3268 235/386 |
| 2010/0142713 A1 * | 6/2010 | Perlman | H04L 9/0894 380/286 |
| 2013/0077791 A1 * | 3/2013 | Kozuka | H04L 9/3268 380/277 |
| 2013/0083926 A1 * | 4/2013 | Hughes | H04L 9/0836 380/278 |
| 2013/0346747 A1 * | 12/2013 | Ignatchenko | H04L 9/3268 713/158 |
| 2014/0281502 A1 * | 9/2014 | Keung Chan | H04L 9/3265 713/157 |
| 2014/0289512 A1 | 9/2014 | Tseng et al. | |
| 2015/0180860 A1 * | 6/2015 | Klieman | H04L 63/0823 713/156 |

OTHER PUBLICATIONS

"Office Action of Europe Counterpart Application", dated Jul. 27, 2015, p. 1-p. 6.

Papadimitratos et al., "Certificate Revocation List Distribution in Vehicular Communication Systems," Proceedings of the fifth ACM international workshop on VehiculAr Inter-NETworking, 2008, pp. 86-87.

Crepeau et al., "A certificate revocation scheme for wireless ad hoc networks," Proceedings of the 1st ACM workshop on Security of ad hoc and sensor networks, 2003, pp. 54-61.

Studer et al., "TACKing Together Efficient Authentication, Revocation, and Privacy in VANETs," 6th Annual IEEE Communications Society Conference on Sensor, Mesh and Ad Hoc Communications and Networks, 2009, pp. 1-9.

Haas et al., "Design and analysis of a lightweight certificate revocation mechanism for VANET," Proceedings of the sixth ACM international workshop on VehiculAr Inter-NETworking, Sep. 25, 2009, pp. 89-98.

Lu et al., "ECPP: Efficient Conditional Privacy Preservation Protocol for Secure Vehicular Communications," INFOCOM, 2008, pp. 1903-1911.

Laberteaux et al., "Security certificate revocation list distribution for vanet," Proceedings of the fifth ACM international workshop on VehiculAr Inter-NETworking, 2008, pp. 88-89.

"Office Action of Taiwan Counterpart Application", dated Nov. 17, 2015, p. 1-p. 4.

* cited by examiner

APPARATUSES AND METHODS FOR CERTIFICATE GENERATION, CERTIFICATE REVOCATION AND CERTIFICATE VERIFICATION

CROSS-REFERENCE TO RELATED APPLICATION

This application claims the priority benefit of Taiwan application serial no. 103107517, filed on Mar. 5, 2014. The entirety of the above-mentioned patent application is hereby incorporated by reference herein and made a part of this specification.

TECHNICAL FIELD

Embodiments of the present disclosure generally relate to certificate generation, revocation and verification apparatuses and methods for generating, revoking and verifying certificates used within network communications.

BACKGROUND

One such solution is a public key cryptosystem. In public key cryptosystems, entities may use certificates provided by a certificate authority to ensure that messages are authentic. A certificate authority may provide an entity with a certificate identifying the entity that the entity may attach to messages to provide authentication to another entity receiving the message. Such certificates provide signature generation and verification.

In some situations, a certificate authority may need to revoke a certificate before it expires, such as when an entity's private key is compromised, when an entity device is malfunctioning, or when an entity's access is revoked. To do this, a certificate authority manages a certificate revocation list (CRL) that contains the list of the revoked certificates that it may then provide to the entities to verify the validity of received certificates.

In some networks, such as vehicular networks for example, a certificate authority may issue tens of thousands of certificates to an entity so that the entity can change the certificate in use on a frequent basis, such as to protect the privacy or identity of the entity.

In such networks, a certificate revocation list may have to list the tens of thousands of certificates issued to an entity if the certificates need to be revoked, causing the certificate revocation list to become unmanageably large and requiring significant processing burden to verify certificates.

SUMMARY

In an embodiment, the certificate authorization device of the present disclosure includes a key set computation unit, a hash function unit, a certificate generation unit, a certificate revocation unit and a certificate revocation list broadcast unit. The key set computation unit receives a secret value and a hash function set, wherein the key set computation unit generates a key set of an entity corresponding to the secret value and the hash function set. The hash function unit generates the hash function set and transferring the hash function set to the key set computation unit. The certificate generation unit receives a plurality of public/private key pairs and the key set, wherein the certificate generation unit generates a plurality of certificates corresponding to the public/private key pairs and the key set. The certificate revocation unit acquires at least one derived secret key covering a revoked certificate set and updating a certificate revocation list. The certificate revocation list broadcast unit receives the certificate revocation list and broadcasts the certificate revocation list. Wherein, the secret value corresponds to a root of a key tree comprising the root and a plurality of sub-nodes, the key set is generated by a plurality of leaves of the key tree, and the derived secret key of each of the sub-nodes is generated by a randomly selected hash function of the hash function set and a corresponding parent node.

In an embodiment, the on-board unit of the present disclosure includes a communication unit and a certificate verification unit. The communication unit transfers a secret value to a certificate authorization device, receives a message comprising a certificate from an entity, and receives a certificate revocation list from the certificate authorization device. The certificate verification unit determines whether the certificate is revoked by comparing the certificate with the certificate revocation list. Wherein, the secret value corresponds to a root of a key tree comprising the root and a plurality of sub-nodes, and a derived secret key each of the sub-nodes is generated by a randomly selected hash function of a hash function set and a corresponding parent node.

In an embodiment, the certification generation method includes: generating a hash function set; receiving a secret value and the hash function set and generating a key set of an entity corresponding to the secret value and the hash function set; and receiving a plurality of public/private key pairs and the key set and generating a plurality of certificates corresponding to the public/private key pairs and the key set; wherein the secret value corresponds to a root of a key tree comprising the root and a plurality of sub-nodes, wherein the key set is generated by a plurality of leaves of the key tree, wherein a derived secret key each of the sub-nodes is generated by a randomly selected hash function of the hash function set and a corresponding parent node.

In an embodiment, the certification revocation method includes: receiving a revoked certificate set; acquiring at least one derived secret key covering the revoked certificate set corresponding to a portion of a plurality of leaves of a key tree and updating a certificate revocation list by the at least one derived secret key; and broadcasting the certificate revocation list to a plurality of entities, wherein the key tree comprises a root and a plurality of sub-nodes, and each of the sub-nodes is generated by a randomly selected hash function of the hash function set and a corresponding parent node.

In an embodiment, the certification verification method includes: receiving a message comprising a certificate from an entity, and receiving a certificate revocation list from a certificate authorization device; determining whether the certificate is revoked by comparing the certificate with the certificate revocation list; and accepting the message if the certificate is not revoked, and disregarding the message if the certificate is revoked, wherein the certificate corresponds to a leaf of a key tree, wherein the key tree comprises a root and a plurality of sub-nodes, and a derived secret key of each of the sub-nodes is generated by a randomly selected hash function of a hash function set and a corresponding parent node.

Additional features and advantages of the present disclosure will be set forth in part in the description which follows, and in part will be obvious from the description, or may be learned by practice of the disclosure. The features and advantages of the disclosure will be realized and attained by means of the elements and combinations particularly pointed out in the appended claims.

It is to be understood that both the foregoing general description and the following detailed description are exemplary and explanatory only and are not restrictive of the disclosure, as claimed.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
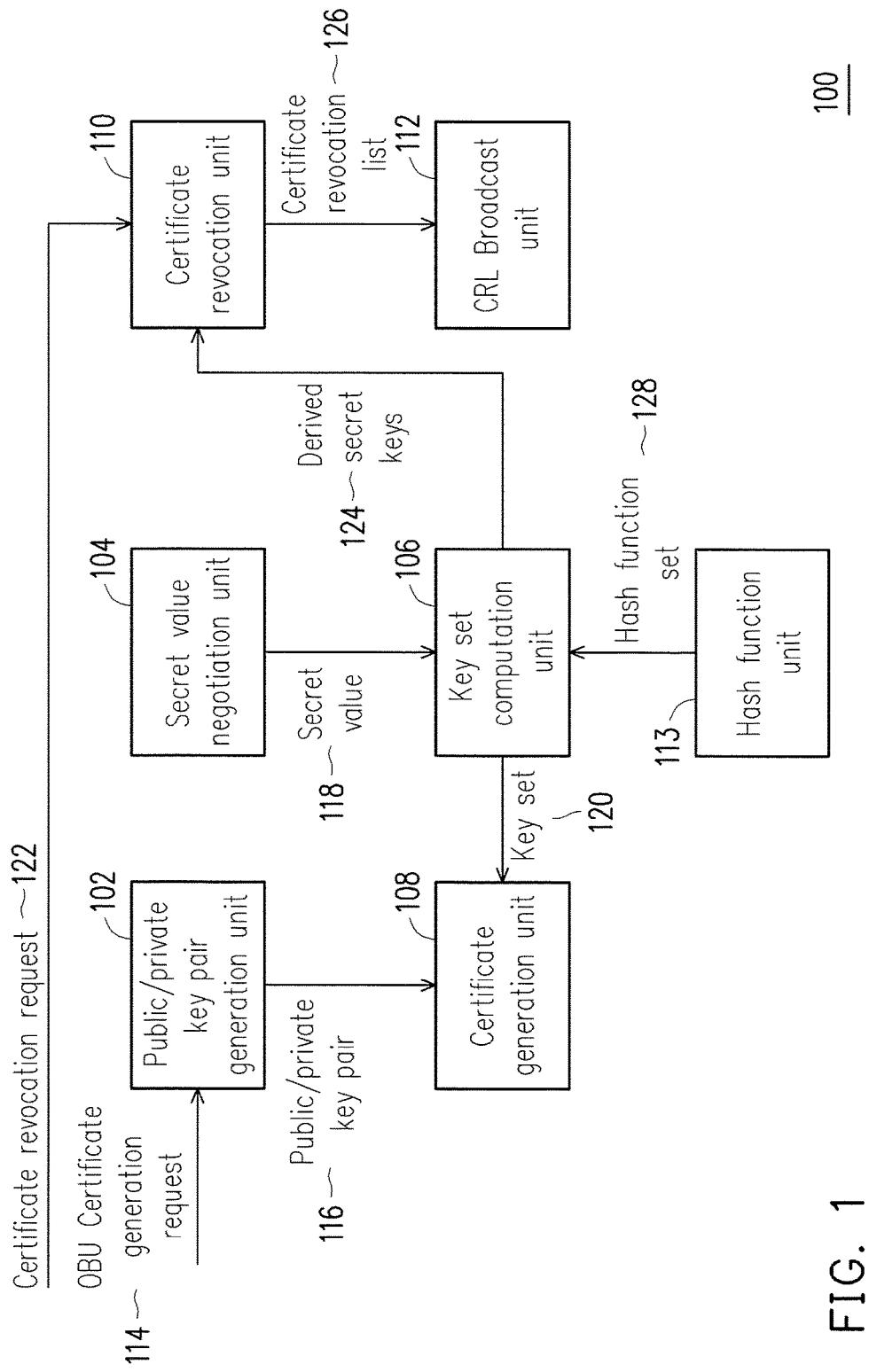
FIG. 1 is a block diagram of a certificate authorization device according to an exemplary embodiment of the present disclosure.

Reference will now be made in detail to the disclosed embodiments of the disclosure, examples of which are illustrated in the accompanying drawings. Wherever possible, the same reference numbers are used in the drawings and the description to refer to the same or like parts.

Many modifications and other embodiments of the disclosure set forth herein will come to mind to one skilled in the art to which these disclosure pertain having the benefit of the teachings presented in the foregoing descriptions and the associated drawings. Therefore, it is to be understood that the disclosure are not to be limited to the specific embodiments disclosed and that modifications and other embodiments are intended to be included within the scope of the appended claims. Although specific terms are employed herein, they are used in a generic and descriptive sense only and not for purposes of limitation.

In public key cryptosystems, entities may use certificates provided by a certificate authority/certificate authorization device (hereinafter abbreviated as CA) to ensure that messages are authentic and senders are trustworthy. A CA may provide an entity with one or more certificates identifying the entity that the entity may attach to messages to provide authentication to another entity receiving the message.

In such systems, a CA and an entity may agree on a secret value that may be used in the generation of the certificates. The CA may generate a series of public/private key pairs for the entity and generate certificates using the public/private key pairs, which the CA then provides to the entity for use in network communications.

When a CA needs to revoke a certificate prior to the expiration of the certificate, such as when an entity's private key is compromised, an entity malfunctions, or access is revoked for an entity, the CA may add the certificate information to a certificate revocation list (CRL) that is provided to all the entities in the network. The entities may use the CRL to verify the validity of a certificate it receives along with a message.

In some systems, a CA may issue a very large number of certificates (e.g. tens of thousands of certificates) to each entity to allow the entity to frequently change the certificate in use, such as to provide improved security and privacy protection for the entities.

In some examples, when a CA revokes certificates in use, it must add the certificate hash value for each certificate, along with other associated data, to the CRL. As such, in systems where each entity has very large numbers of certificates, the CRL becomes inefficient as it rapidly increases in size and requires increasingly more processing resources to verify certificate validity.

In another example, when a CA revokes certificates in use, it adds the secret value used for generation of the entity's certificates, along with other data, to the CRL. In such systems, when the CA adds the secret value to the CRL it discloses all the entity's certificates and may also compromise the privacy of the entity.

One example of such a communication network is an Intelligent Transportation System (ITS). An ITS provides monitoring and management of a transportation system to more effectively use the limited resources and reduce congestion, delays, and costs. In an ITS, vehicles are equipped with an on-board unit (OBU) and wireless communication devices. The OBU may then communicate with nearby vehicles and road-side units (RSU) and participate in the ITS. In such networks, the OBUs and RSUs may use public key cryptosystems to ensure the authenticity and correctness of the messages being exchanged.

In such an ITS, a CA may issue tens of thousands of certificates to each OBU so that the OBU may frequently change the certificate in use, such as every ten minutes for example. Frequently changing the certificate in use for a vehicle may provide privacy protection for the actual identity of the vehicles participating in the ITS.

Embodiments of the present disclosure provide generation, revocation, and validation of certificates that meet the needs for authentication and privacy, and may reduce the resources required to maintain the certificate revocation list.

FIG. 1 is a block diagram of a certificate authority/certificate authorization device (CA) 100 according to an exemplary embodiment of the present disclosure. Referring to FIG. 1, the CA 100 may include a public/private key pair generation unit 102, a secret value negotiation unit 104, a key set computation unit 106, a certificate generation unit 108, a certificate revocation unit 110, a CRL broadcast unit 112, and a hash function unit 113.

In an exemplary embodiment, the CA 100 may receive a certificate generation request 114 from an entity. The public/private key pair generation unit 102 may then generate a number of public/private key pairs for the requesting entity and send the public/private key pairs 116 to the certificate generation unit 108.

The secret value negotiation unit 104 may determine a secret value 118, e.g. K, between the CA 100 and the requesting entity. The secret value negotiation unit 104 may then send the secret value 118 to the key set computation unit 106. The hash function unit 113 may generate a hash function set 128 including randomly selected hash functions and send the hash function set 128 to the key set computation unit 106. The key set computation unit 106 may then generate a derived key set by constructing a key tree, as subsequently described in FIG. 3, with a root node of the secret value 118 ("K"), and each edge of the key tree is represented by different randomly selected hash functions of the hash function set 128. The key set computation unit 106 may then send the derived key set 120 to the certificate generation unit 108.

The certificate generation unit 108 may then use the public/private key pairs 116 and the derived key set 120 to generate the certificates for use by the requesting entity. In an exemplary embodiment, a generated certificate may comprise a derived secret key from a leaf of the key tree, an index of the derived secret key, a public key for the entity, a CA signature, and at least one index of at least one randomly selected hash function of the hash function set 128. The CA 100 may then send the series of certificates to the requesting entity for use in securing and authenticating messages. In an exemplary embodiments, the generated certificates are unrelated and not linked together and cannot be used to trace the actual identity of the entity.

The CA 100 may, at some later time, determine a need to revoke one or more unexpired certificates previously generated for an entity. Additionally or alternatively, the CA 100 may receive an indication that one or more of an entity's unexpired certificates should be revoked. The CA 100 may then cause a certificate revocation request 122 to be generated and provided to certificate revocation unit 110. The certificate revocation unit 110 may determine the certificates that need to be revoked and the key set computation unit 106 determines the derived secret keys 124 corresponding to a revoked certificate set (i.e., at least one common parent value of a minimum number of sub-trees comprising only a portion of the leaves corresponding to the revoked certificate set). The certificate revocation unit 110 may then use the derived secret keys 124 to update a certificate revocation list (CRL), which is originally kept in the certificate revocation unit 110 for storing certificate revocation information, by causing the derived secret keys 124 along with other associated data to be added to the CRL. In an exemplary embodiment, the certificate revocation unit 110 may add an entry to the CRL for each of the identified derived secret keys, wherein the entry comprises an index of the derived secret key (e.g., the index of the key tree node containing the derived secret key), the derived secret key, and the height of the key tree node containing the derived secret key.

The certificate revocation unit 110 may provide the updated CRL 126 to the CRL broadcast unit 112 which may then cause the CRL to be periodically transmitted to one or more entities within the network. The entities may use the CRL in determining whether received certificates are valid or revoked.

In some embodiments, the CA 100 may be a centralized server providing certificate generation and revocation service. The public/private key pair generation unit 102, the secret value negotiation unit 104, the key set computation unit 106, the certificate generation unit 108, the certificate revocation unit 110, the CRL broadcast unit 112, and the hash function unit 113 may be program codes implemented in form of software or firmware. However, the present disclosure is not limited thereto. The public/private key pair generation unit 102, the secret value negotiation unit 104, the key set computation unit 106, the certificate generation unit 108, the certificate revocation unit 110, the CRL broadcast unit 112, and the hash function unit 113 may be implemented as computation circuits. The public/private key pair generation unit 102, the secret value negotiation unit 104, the certificate revocation unit 110, the CRL broadcast unit 112 may couple to a communication unit (not shown) to transmit data to an entity or receive data from the entity. In another embodiment, a communication unit (not shown) may be implemented in the public/private key pair generation unit 102, the secret value negotiation unit 104, the certificate revocation unit 110 or the CRL broadcast unit 112 to transmit data to an entity or receive data from the entity.

Figure 2:
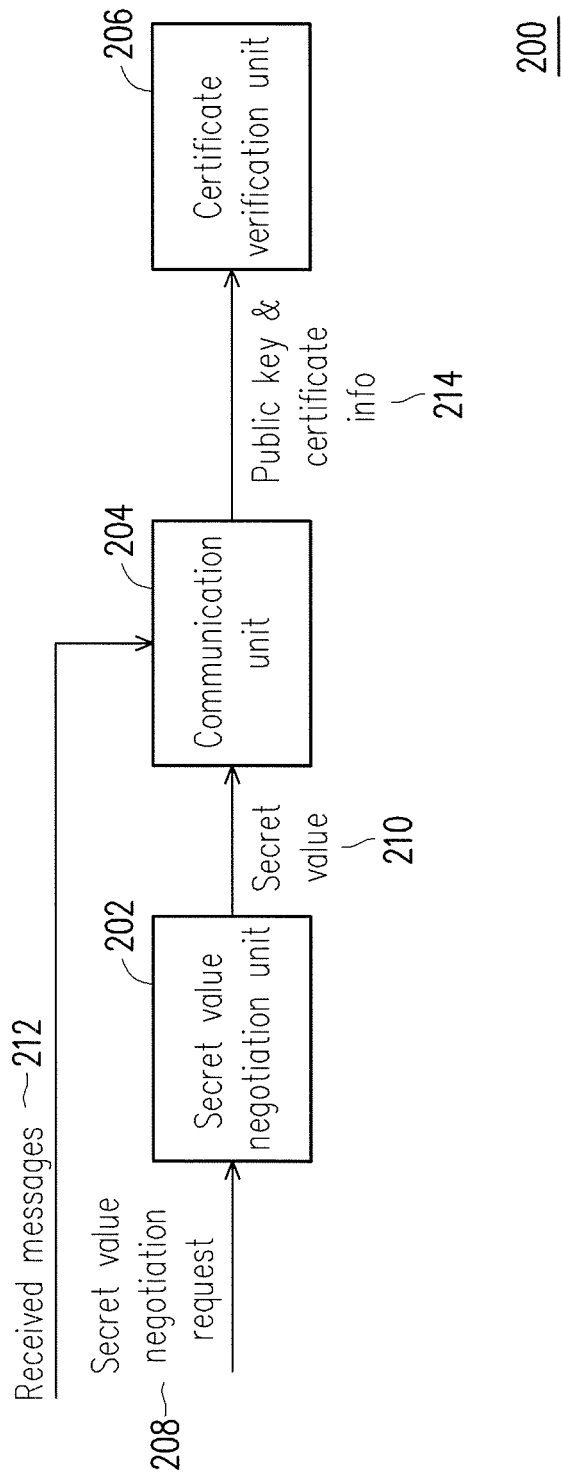
FIG. 2 is a block diagram of an on-board unit according to an exemplary embodiment of the present disclosure.

FIG. 2 is a block diagram of an on-board unit 200 according to an exemplary embodiment of the present disclosure. In an exemplary embodiment, the on-board unit 200 may comprise at least a secret value negotiation unit 202, a communication unit 204, and a certificate verification unit 206.

The secret value negotiation unit 202 may receive a secret value negotiation request 208 as part of the operations of requesting certificates from the CA 100, such as described in FIG. 1. The secret value negotiation unit 202 may determine a secret value, e.g. K, and provide the secret value 210 to the communication unit 204 to cause transmission of the secret value to the CA 100 (or e.g. the secret value negotiation unit 104) for use in certificate generation. The entity may transmit and receive data through the communication unit 204, such as receiving generated certificates from the CA 100 (or e.g. the certificate generation unit 108), receiving the CRL from the CA 100 (or e.g. the CRL broadcast unit 112), as well as transmitting and receiving messages to and from other entities in the network.

The communication unit 204 may periodically receive the CRL from the CA 100 (or e.g. the CRL broadcast unit 112) and send it to the certificate verification unit 206 for use in certificate verification of received messages.

The communication unit 204 may receive messages from other entities in the network. The received messages 212 may comprise message data, a message signature (e.g., signature of the sending entity generated using its private key), and a certificate from the sending entity. The communication unit 204 may send the received certificate information 214 to the certificate verification unit 206 to determine if the received certificate is valid or revoked.

The certificate verification unit 206 may calculate and compare information derived from the received certificate and the CRL to determine if the received certificate has been revoked. If the certificate verification unit 206 determines that the received certificate has been revoked, it may provide an indication that the message should be disregarded.

In some embodiments, the on-board unit 200 may be an electronic device installed on a vehicle that performs certificate verification operation. The secret value negotiation unit 202 and the certification verification unit 206 may be program codes implemented in form of software or firmware. However, the present disclosure is not limited thereto. The secret value negotiation unit 202 and the certification verification unit 206 may be implemented as computation circuits. The communication unit 204 may be a communication chip that supports one of global system for mobile communication (GSM), personal handy-phone system (PHS), code division multiple access (CDMA) system, wireless fidelity (Wi-Fi) system, worldwide interoperability for microwave access (WiMax) system, $3^{rd}$ generation (3G), dedicated short-range communications (DSRC) or long-term evolution (LTE) system, or any two or more combinations of the above thereof.

Figure 3:
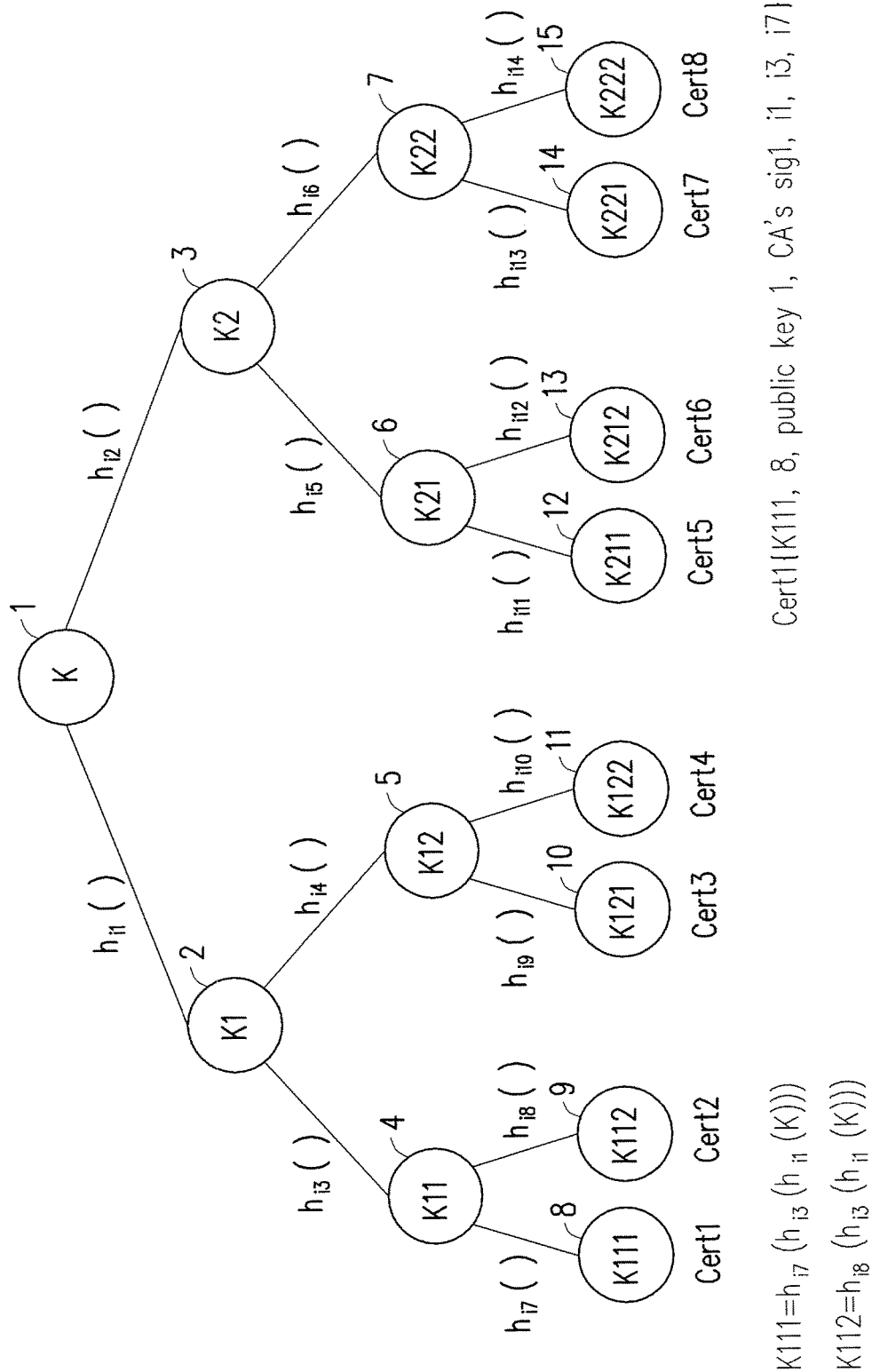
FIG. 3 illustrates a key tree used in certificate generation and revocation according to an exemplary embodiment of the present disclosure.

FIG. 3 illustrates a key tree used in certificate generation and revocation according to an exemplary embodiment of the present disclosure. In an exemplary embodiment, a CA 100 (or e.g. the secret value negotiation unit 104) and an entity may agree upon a secret value, K, for use in generating certificates for the entity. The CA 100 (or e.g. the key set computation unit 106) may then perform operations to construct a key tree whose root's value is the secret value K. The CA 100 (or e.g. the certificate generation unit 108) may then use the derived secret keys of the key tree leaves in the generation of the certificates.

In an exemplary embodiment, the CA 100 (or e.g. the key set computation unit 106) may construct a binary key tree by using randomly selected hash functions to generate the children of each corresponding parent node. For example, the CA 100 (or e.g. the key set computation unit 106) may generate each node by applying different randomly selected hash functions to the value of the corresponding the parent node. Although the exemplary embodiment describes a binary key tree using different randomly selected hash functions, other types of key trees may also be constructed using different randomly selected hash functions, such as a tertiary key tree using different randomly selected hash functions to generate the children nodes of each parent node, or an n-ary key tree using different randomly selected hash functions to generate the children nodes of each parent node.

As shown in FIG. 3, the CA 100 (or e.g. the key set computation unit 106) constructs an example key tree for eight certificates starting from root node 1 of the key tree using the secret value K. The CA 100 (or e.g. the key set computation unit 106) may generate a left child node 2 of the root node 1 by applying a randomly selected hash function $h_{i1}(\ )$ to the root value K to calculate derived secret key K1. The CA 100 (or e.g. the key set computation unit 106) may generate a right child node 3 of the root node 1 by applying another randomly selected hash function, $h_{i2}(\ )$ to the root value K to calculate derived secret key K2.

In the same manner, the CA 100 (or e.g. the key set computation unit 106) may generate node 4 to node 7 by applying randomly selected hash functions $h_{i3}(\ )$ to $h_{i6}(\ )$ respectively to the parents' value K1 and K2 to calculate derived secret keys K11, K12, K21 and K22. The CA 100 (or e.g. the key set computation unit 106) may further generate node 8 to node 15 by applying randomly selected hash functions $h_{i7}(\ )$ to $h_{i14}(\ )$ respectively to the parents' value K11, K12, K21 and K22 to calculate derived secret keys K111 to K222.

The CA 100 (or e.g. the certificate generation unit 108) may then use the derived values of the leaf nodes to generate the certificates. For example, the CA 100 (or e.g. the certificate generation unit 108) may use derived secret key K111 to generate the first certificate, Cert1; use the derived secret key K112 to generate the second certificate, Cert2; use derived secret key K121 to generate the third certificate, Cert3; use derived secret key K122 to generate the fourth certificate, Cert4; use derived secret key K211 to generate the fifth certificate, Cert5; use derived secret key K212 to generate the sixth certificate, Cert6; use derived secret key K221 to generate the seventh certificate, Cert7; and use derived secret key K222 to generate the eighth certificate, Cert8.

In the described exemplary embodiment, the first certificate, Cert1, may include the derived secret key K111, the node index 8, the entity public key 1, the CA signature 1, and hash function indices i1, i3, i7. As described in an exemplary embodiment, it is difficult to derive the original secret value K from the certificate derived secret key.

In some embodiments, before construction of the key tree, the CA 100 (or e.g. the key set computation unit 106) determines the height of the key tree by the number of the certificates required by the entity.

Figure 4:
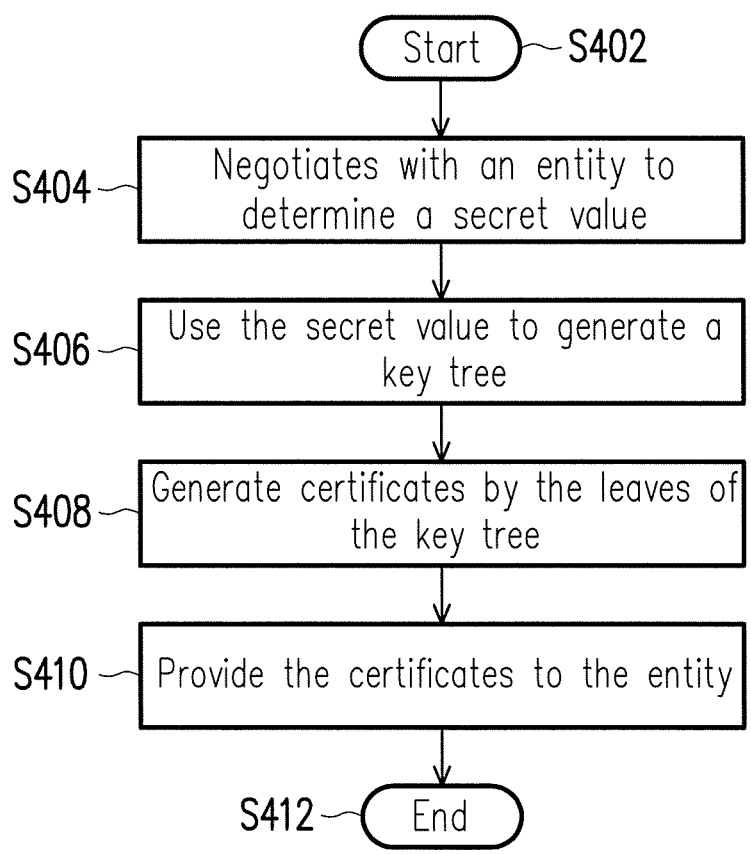
FIG. 4 illustrates a flow chart of example operations that may be used in certificate generation according to an exemplary embodiment of the present disclosure.

FIG. 4 illustrates a flow chart of example operations that may be used in certificate generation according to an exemplary embodiment of the present disclosure. A CA 100 may perform certificate generation by starting operation, such as shown in step S402.

As shown at step S404, the CA 100 (or e.g. the secret value negotiation unit 104) may negotiate with an entity to determine a secret value to be used for generation of a key tree and certificates for the entity. At step S406, the CA 100 (or e.g. the key set computation unit 106) may then use the secret value to generate a key tree, such as the key tree described in regard to FIG. 3 above.

As shown at step S408, the CA 100 (or e.g. the certificate generation unit 108) may then use the key tree in generating certificates for the entity. For example, the CA 100 (or e.g. the certificate generation unit 108) may use the derived secret key of each of the leaves of the key tree, as well as the entity's public keys and the CA's private key, to generate the set of certificates for the entity. The CA 100 (or e.g. the certificate generation unit 108) may then provide the certificates to the entity, such as shown at step S410. The operation then continues to step S412 and ends.

Figure 5:
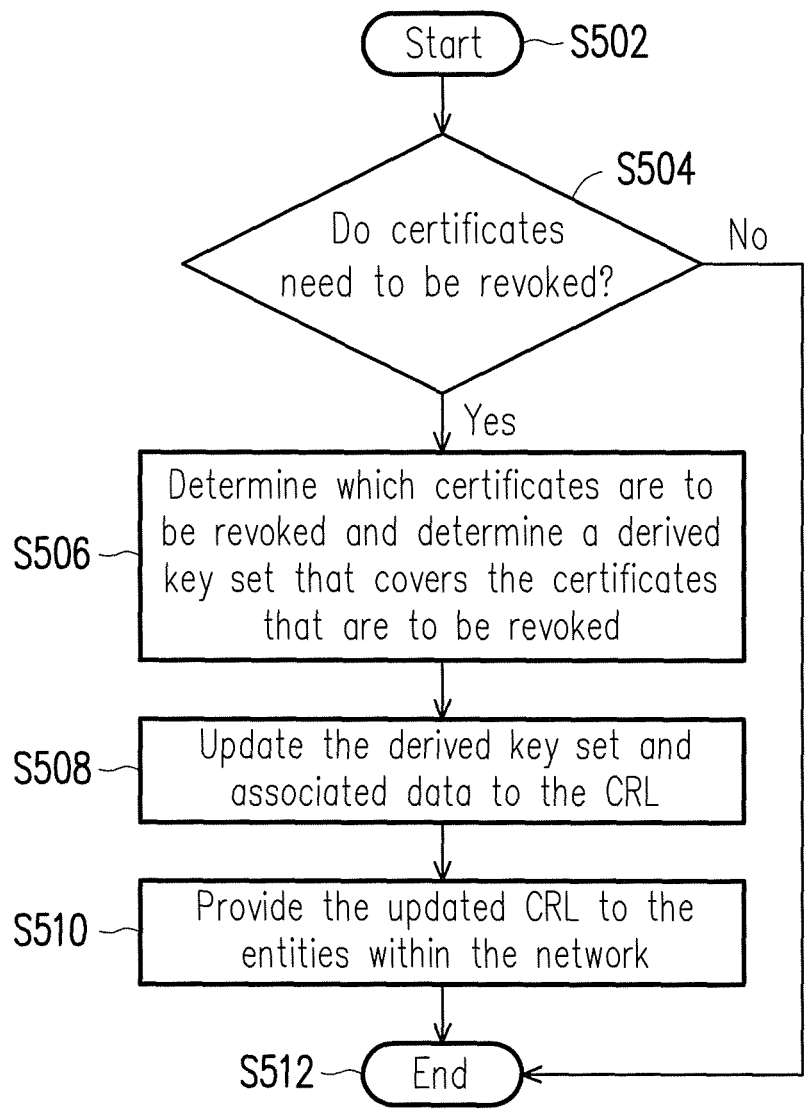
FIG. 5 illustrates a flow chart of example operations that may be used in certificate revocation according to an exemplary embodiment of the present disclosure.

FIG. 5 illustrates a flow chart of example operations that may be used in certificate revocation according to an exemplary embodiment of the present disclosure. A CA 100 may perform certificate revocation by starting operation, such as shown instep S502.

As shown at step S504, the CA 100 may determine whether there are certificates that should be revoked. If there are no certificates to be revoked, the operation may continue to step S512 and end. If the CA 100 determines that there are certificates to be revoked, the operation may continue to step S506.

As shown in step S506, the CA 100 (or e.g. the key set computation unit 106) may determine which certificates are to be revoked and may determine a derived key set that covers the certificates that are to be revoked. For example, the CA 100 (or e.g. the key set computation unit 106) may use the key tree to determine the at least one common parent node of the key tree's least sub-trees that includes only the revoked certificates.

As shown in step S508, the CA 100 (or e.g. the certificate revocation unit 110) may update the derived key set and associated data to the CRL. The CA 100 (or e.g. the CRL broadcast unit 112) may then provide the updated CRL to the entities within the network, such as shown at step S510. The operation then continues to step S512 and ends.

In an exemplary embodiment, using the key tree of FIG. 3, the CA 100 (or e.g. the key set computation unit 106) may determine that certificates 3 through 8 should be revoked. The CA 100 (or e.g. the key set computation unit 106) may determine that derived secret key K12 at node 5 covers certificates 3 and 4 and derived secret key K2 at node 3 covers certificates 5 through 8.

The CA 100 (or e.g. the certificate revocation unit 110) may then add the set of derived secret keys and the corresponding index and height to the CRL. For example, the CA 100 (or e.g. the certificate revocation unit 110) may cause two entries to be added to the CRL; a first entry comprising index 5, derived secret key K12, and height 1 (indicating that a node having the derived secret key K12 has a height of 1 up from its leaf node); and a second entry comprising index 3, derived secret key K2, and height 2. As such, in the example embodiment, the CA 100 (or e.g. the certificate revocation unit 110) may only add two entries to the CRL to cover the six revoked certificates, rather than adding entries for each of the six certificates. The CA 100 (or e.g. the CRL broadcast unit 112) may then cause the CRL to be sent to the entities in the network when the CRL is updated and may also cause the CRL to be sent to the entities on a periodic basis.

In an exemplary embodiment, a first entity may cause a message to be sent to a second entity. When the second entity receives the message, the second entity may verify the validity of the first entity's certificate included with the received message data. In an exemplary embodiment, the second entity may verify the certificate validity by checking the index of the certificate and the parent indices of the certificate against the CRL. The second entity may compute a hashed derived secret key based on hash functions indices of the certificate and the derived secret key on the CRL and compare the hashed derived secret key with the derived secret key of the certificate. If the second entity finds a match to the values on the CRL, the second entity may disregard the received message.

Figure 6:
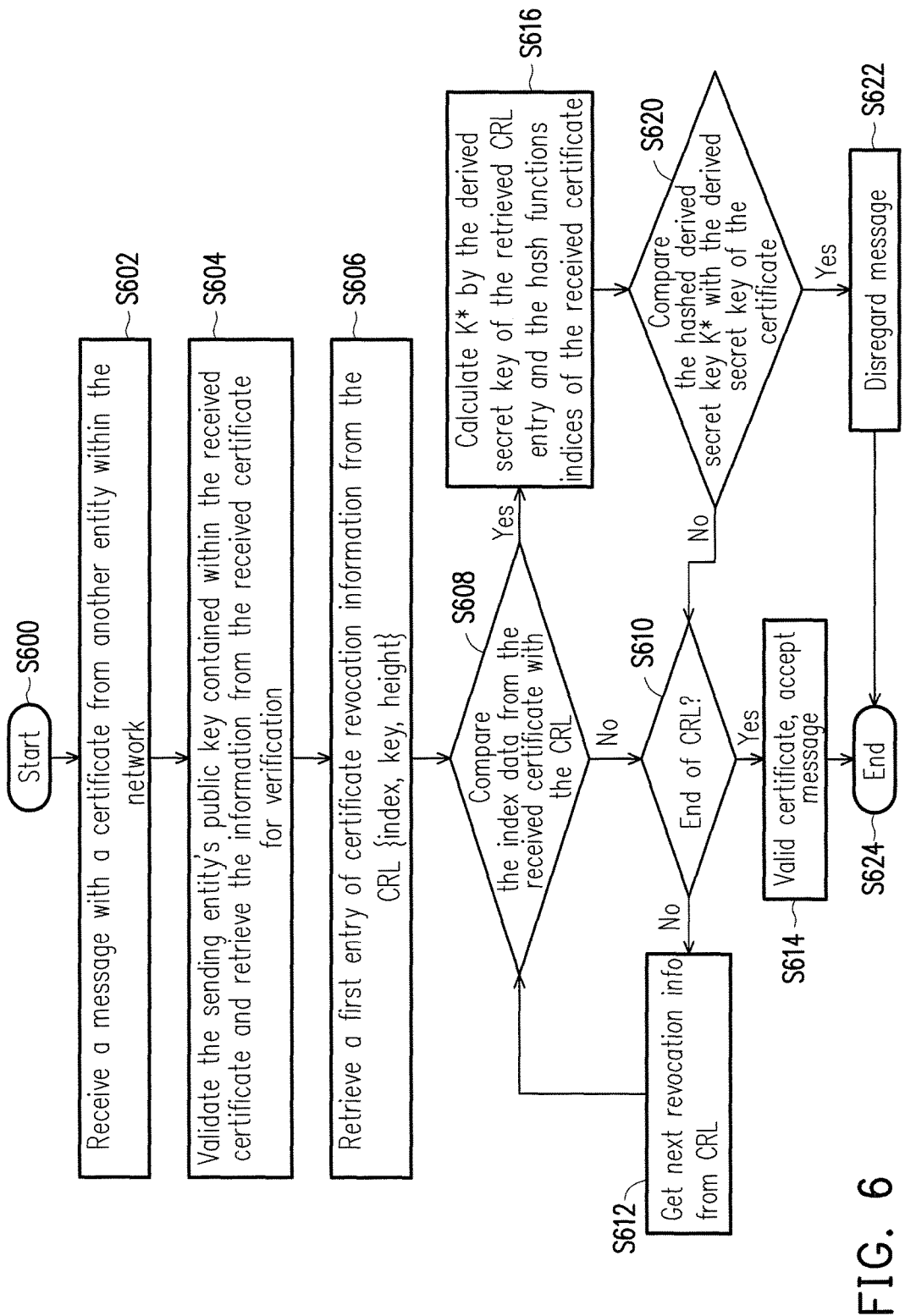
FIG. 6 illustrates a flow chart of example operations that may be used in certificate verification according to an exemplary embodiment of the present disclosure.

FIG. 6 illustrates a flow chart of example operations that may be used in certificate verification according to an exemplary embodiment of the present disclosure. An entity may begin operations for certificate verification such as shown at step S600. As shown in step S602 an entity may receive a message with a certificate from another entity within the network.

As shown in step S604, the receiving entity may validate the sending entity's public key contained within the received certificate and retrieve the information from the received certificate for verification. In an embodiment, the receiving entity may retrieve the derived secret key and the index from the received certificate.

As shown in step S606 the receiving entity may then retrieve a first entry of certificate revocation information from the CRL. In an embodiment, the receiving entity may retrieve the first entry comprising an index, derived secret key, and height from the CRL. For example, the receiving entity may retrieve a first entry from the CRL comprising index 3, derived secret key K2, and height 2.

The receiving entity may then compare the index data from the received certificate with the CRL, as shown in step S608. For example, if the receiving entity receives certificate Cert2 {K112, 9, public key 2, CA signature 2, i1, i3, i8} having index 9 as described in FIG. 3, the receiving entity may divide the certificate index by the dimension of the key tree (e.g., dividing by 2 for a binary tree) and perform the floor operation. Because the height of the first entry of CRL is 2 (i.e., there are 2 edges between the node with derived secret key K2 and the leaf nodes representing the certificates), the division and floor operation has to be performed twice to determine whether certificate Cert2 is a leaf of a sub-tree having the root K2. For example, floor(9/2)=4, and floor(4/2)=2. If the calculated index value (e.g., 2) does not match the index (e.g., 3) of certificate revocation information from the CRL, the operation may continue to step S610.

As shown in step S610, the receiving entity may then determine if there are more entries in the CRL that should be compared. If there are additional entries on the CRL, operation continues to step S612 where the next certificate revocation information is retrieved from the CRL. Operation then returns to step S608. If there are no more entries on the CRL, operation continues to step S614.

For example, the receiving entity may compare the calculated index value 2 of the received certificate with the CRL entry index of 3 and since the calculated index value do not match the retrieved CRL entry index, the receiving entity may then check to see if there are more entries on the CRL and if so, repeat the comparison operation.

As shown in step S614, if the received certificate does not match any entry on the CRL, the certificate may be indicated as valid and the receiving entity may accept the message. Operation may then continue to step S624 and end.

At step S608, if the index data does match the certificate revocation information from the CRL, the operation may continue to step S616.

For example, if the receiving entity receives certificate Cert5 having index 12 and derived secret key K211, as described in FIG. 3, the receiving entity may determine the calculated index 3 (e.g., floor(12/2)=6, and floor(6/2)=3) matching the CRL entry index of 3.

As shown in step S616, the receiving entity may calculate K* by the derived secret key of the retrieved CRL entry and the hash functions indices of the received certificate. For example, using certificate Cert5 {K211, 12, public key 5, CA signature 5, i2, i5, i11}, the receiving entity calculates K* by selecting the last 2 hash function indices of certificate Cert5 (according to height 2 of the first entry of CRL) and perform hash operations on the derived key secret K2 of the first entry of CRL. For example, $K^*=h_{i11}(h_{i5}(K2))$.

In some embodiments, the entity and the CA 100 (or e.g. the hash function unit 113) may share the same hash function pool including a plurality of randomly selected hash functions, wherein the same hash function in the hash function pools of the CA 100 (or e.g. the hash function unit 113) and the entity may have an identical hash function index. When calculating K*, the entity may refer to the hash function indices in the certificate, for example, i5 and i11, and may then use the indices to retrieve the corresponding hash functions $h_{i5}(\ )$ and $h_{i11}(\ )$ stored in the hash function pool of the entity. Consequently, K* is derived by hash functions $h_{i5}(\ )$ and NO, and the derived secret key K2.

As shown in step S620, the receiving entity may compare the hashed derived secret key K* with the derived secret key of the certificate. If the keys match, the operation continues to step S622 where the received certificate may be indicated as revoked and the receiving entity may disregard the message. Operation may then continue to step S624 and end. For example, if the hashed derived secret key K* matches the certificate Cert5's derived secret key of K211, the receiving entity determines that certificate Cert5 has been revoked.

At step S620, if the hashed derived key K* and the derived secret key of the certificate do not match, operation may continue to step S610. As shown in step S610, the receiving entity may then determine if there are more entries in the CRL that should be compared. If there are additional entries on the CRL, operation continues to step S612 where the next certificate revocation information is retrieved from the CRL. Operation then returns to step S608. If there are no more entries on the CRL, operation continues to step S614.

Figure 7:
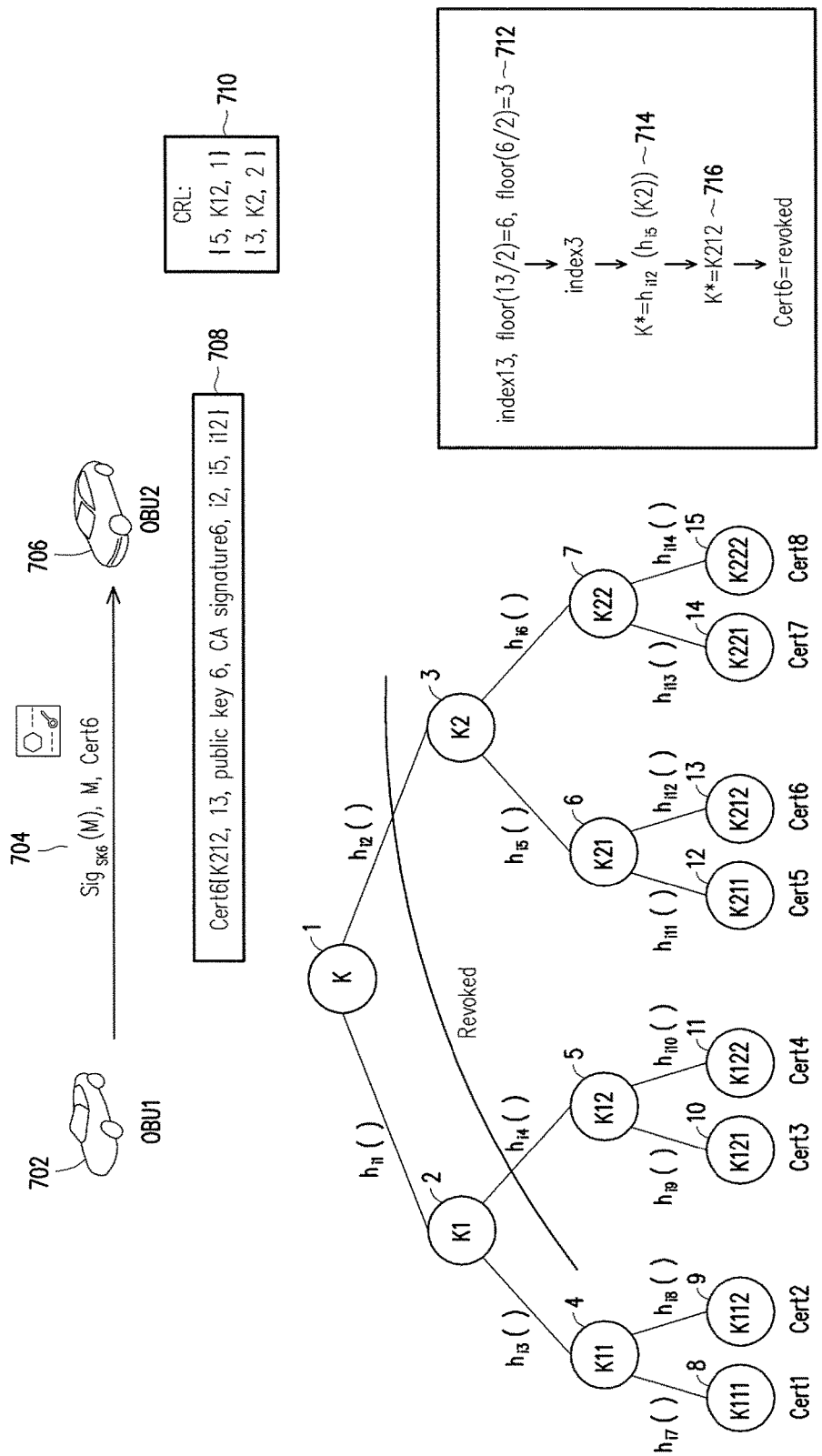
FIG. 7 illustrates a schematic overview of operations for certificate verification according to an exemplary embodiment of the present disclosure.

FIG. 7 illustrates a schematic overview of operations for certificate verification according to an exemplary embodiment of the present disclosure.

As shown in FIG. 7, a first entity, such as entity 702, may send a message 704 to a second entity, such as entity 706. The message 704 may have been generated by entity 702 and include a message signature, SigSK6(M), generated using the private key 6 of entity 702, the message data M, and certificate Cert6 of entity 702.

Entity 706 may then retrieve the certificate data from certificate Cert6 708 including derived secret key K212 and index 13 for use in validating the certificate. Entity 706 may have previously received the CRL 710 from the CA 100 (or e.g. the CRL broadcast unit 112) comprising entries of {index 5, derived secret key K12, height 1} and {index 3, derived secret key K2, height 2}.

For each entry on the CRL 710, entity 706 may then compute the index, as shown at 712, for certificate Cert6. Entity 706 may then compare the computed index with the entries on CRL 710 and determine that index 3 is on the second entry of CRL 710. Entity 706 may then compute a hashed derived secret key K* using the key of CRL 710 and the hash function indices of the certificate Cert6 708, as shown at 714. Entity 706 may then compare the hashed derived secret key K* with the derived secret key of certificate Cert6, K212, and determine that the keys match, as shown at 716. Entity 706 may then deter Me that certificate Cert6 has been revoked and disregard the message from entity 702.

As described above, the certificate generation and verification methods of the present disclosure construct a key tree for each entity and each key node of the key tree is generated by a randomly selected hash function. The certificates are generated by the leaf nodes of the key tree. When a set of certificates are revoked, instead of storing the hashed values of all the revoked certificates in the certificate revocation list, only the roots of the least sub-trees covering the revoked certificates are recorded in the certificate revocation list. In this manner, the size of the certificate revocation list is reduced while the identity of an on-board unit would not be identified by the certificate revocation list, and the multiple certificates of the same on-board unit do not relate to each other.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A certificate authorization device, comprising:
   a storage device storing codes; and
   a processor performing the codes to:
      receive a secret value, generate a hash function set, and generate a key set of an entity corresponding to the secret value and the hash function set;
      receive a plurality of public/private key pairs and the key set, and generate a plurality of certificates corresponding to the public/private key pairs and the key set$_1$ wherein the entity receives the certificates from the certificate authorization device and provides an authentication to, another entity receiving a message from the entity by attaching the certificates to the message;
      acquire at least one derived secret key covering a revoked certificate set and update a certificate revocation list according to the revoked certificate set, wherein the revoked certificate set has a plurality of revoked certificates among the plurality of certificates and
      receive the certificate revocation list and broadcasting the certificate revocation list,
   wherein the secret value corresponds to a root of a key tree comprising the root and a plurality of sub-nodes,
   wherein two derived secret keys of two of the sub-nodes are respectively generated by a derived secret key of the root and two randomly selected hash functions of the hash function set,
   wherein two derived secret keys of two child nodes among the sub-nodes other than the said two of the sub-nodes are respectively generated by a derived secret key of a parent node of the said two child nodes and randomly selected hash functions of the hash function set,
   wherein a plurality of leaves of the key tree are a plurality of nodes, which do not have any child node, among the sub-nodes, and the plurality of leaves of the key tree are corresponding to the plurality of the certificates,
   wherein the key set is generated by the plurality of leaves of the key tree,
   wherein the certificate revocation list comprises at least one derived secret key of at least one root of a minimum number of sub-trees of the key tree wherein all the leaves of the sub-trees are corresponding to all the revoked certificates of the revoked certificate set.

2. The certificate authorization device according to claim 1, the processor further performing the codes to:
   generate the public/private key pairs; and
   negotiate the secret value with the entity.

3. The certificate authorization device according to claim 1, wherein a height of the key tree is determined by the number of the certificates required by the entity.

4. The certificate authorization device according to claim 1, wherein each entry of the certificate revocation list comprises an index of a node of the key tree, the derived secret key corresponding to the node, and a height of the node:
   wherein the certificates comprise the derived secret key corresponding to a leaf node of the key tree, the index of the leaf node, a public key of the public/private key pairs of the entity, a certificate authority signature, and at least one index of at least one randomly selected hash function of the hash function set.

5. An on-board unit, comprising:
   a communication chip transferring a secret value to a certificate authorization device, receiving a message comprising a certificate from an entity, and receiving a certificate revocation list from the certificate authorization device, wherein the entity provides an authentication to the on-board unit receiving the message by attaching the certificate to the message, wherein the certificate is one of a plurality of certificates generated by the certificate authorization device, and the generated certificates are received by the entity from the certificate authorization device,
   wherein the secret value corresponds to a root of a key tree comprising the root and a plurality of sub-nodes,
      wherein two derived secret keys of two of the sub-nodes are respectively generated by a derived secret key of the root and two randomly selected hash functions of the hash function set,
      wherein two derived secret keys of two child nodes among the sub-nodes other than the said two of the sub-nodes are respectively generated by a derived secret key of a parent node of the said two child nodes and randomly selected hash functions of the hash function set,
      wherein a plurality of leaves of the key tree are a plurality of nodes, which do not have any child node, among the sub-nodes, and the plurality of leaves of the key tree are corresponding to the plurality of the certificates;
   a storage device storing codes; and
   a processor performing the codes to:

determine whether the certificate is revoked by comparing the certificate with the certificate revocation list, wherein the certificate revocation list comprises at least one derived secret key of at least one root of a minimum number of sub-trees of the key tree, wherein all the leaves of the sub-trees are corresponding to all the revoked certificates among the plurality of certificates.

6. The on-board unit according to claim 5, wherein a certificate verification unit determines whether an index in the certificate is covered in the certificate revocation list,
when the index in the certificate is not covered in the certificate revocation list, the certificate verification unit identifies that the certificate is indicated valid and the message is accepted; and
when the index in the certificate is covered in the certificate revocation list, the certificate verification unit compares the derived secret key in the certificate with a hashed value of the derived secret key in the certification revocation list hashed by at least one hash function indicated in the certificate, and if the derived secret key in the certificate matches the hashed value, the certificate verification unit identifies that the certificate is revoked and the message is disregarded.

7. The on-board unit according to claim 5, the processor further performing the codes to:
negotiate the secret value with the certificate authorization device.

8. The on-board unit according to claim 5, wherein each entry of the certificate revocation list comprises an index of a node of the key tree, the derived secret key corresponding to the node, and a height of the node;
wherein the certificate comprise the derived secret key corresponding to a leaf node of the key tree, the index of the leaf node, a public key of a public/private key pairs of the entity, a certificate authority signature, and at least one index of at least one randomly selected hash function of the hash function set.

9. A certificate generation method, performed on a certificate authorization device having a processor, the certificate generation method comprising:
generating a hash function set by the processor;
receiving a secret value and the hash function set and generating a key set of an entity corresponding to the secret value and the hash function set by the processor; and
receiving a plurality of public/private key pairs and the key set and generating a plurality of certificates corresponding to the public/private key pairs and the key set by the processor, wherein the entity receives the certificates from the certificate authorization device and provides an authentication to another entity receiving a message from the entity by attaching the certificates to the message;
wherein the secret value corresponds to a root of a key tree comprising the root and a plurality of sub-nodes,
wherein two derived secret keys of two of the sub-nodes are respectively generated by a derived secret key of the root and two randomly selected hash functions of the hash function set,
wherein two derived secret keys of two child nodes among the sub-nodes other than the said two of the sub-nodes are respectively generated by a derived secret key of a parent node of the said two child nodes and randomly selected hash functions of the hash function set,
wherein a plurality of leaves of the key tree are a plurality of nodes, which do not have any child node, among the sub-nodes, and the plurality of leaves of the key tree are corresponding to the plurality of the certificates;
wherein the key set is generated by the plurality of leaves of the key tree,
updating a certificate revocation list according to a revoked certificate set having a plurality of revoked certificates among the plurality of certificates, wherein the certificate revocation list comprises at least one derived secret key of at least one root of a minimum number of sub-trees of the key tree wherein all the leaves of the sub-trees are corresponding to all the revoked certificates of the revoked certificate set.

10. The certificate generation method according to claim 9, wherein the step of receiving the secret value further comprises:
negotiating the secret value with the entity;
wherein the step of generating the plurality of certificates further comprises:
generating the certificates by the leaves of the key tree.

11. The certificate generation method according to claim 9, further comprising:
determining a height of the key tree by the number of the certificates required by the entity.

12. The certificate generation method according to claim 9, wherein the certificates comprise the derived secret key corresponding to a leaf node of the key tree, an index of the leaf node, a public key of the public/private key pairs of the entity, a certificate authority signature, and at least one index of at least one randomly selected hash function of the hash function set.

13. A certificate revocation method, performed on a certificate authorization device having a processor, the certificate revocation method comprising:
receiving a revoked certificate set having a plurality of revoked certificates among the plurality of certificates by the processor, wherein the plurality of revoked certificates are corresponding to a portion of a plurality of leaves of a key tree;
acquiring at least one derived secret key covering the revoked certificate set and updating a certificate revocation list by the at least one derived secret key by the processor; and
broadcasting the certificate revocation list to a plurality of entities received a plurality of certificates from the certificate authorization device by the processor, wherein one of the entities provides an authentication to another one of the entities receiving a message from the said one of the entities by attaching the certificates to the message,
wherein the key tree comprises a root and a plurality of sub-nodes;
wherein two derived secret keys of two of the sub-nodes are respectively generated by a derived secret key of the root and two randomly selected hash functions of the hash function set,
wherein two derived secret keys of two child nodes among the sub-nodes other than the said two of the sub-nodes are respectively generated by a derived secret key of a parent node of the said two child nodes and randomly selected hash functions of the hash function set,
wherein a plurality of leaves of the key tree are a plurality of nodes, which do not have any child node, among the sub-nodes, and the plurality of leaves of the key tree are corresponding to the plurality of the certificates;

wherein the certificate revocation list comprises at least one derived secret key of at least one root of a minimum number of sub-trees of the key tree, wherein all the leaves of the sub-trees are the portion of the plurality of leaves corresponding to all the revoked certificates of the revoked certificate set.

14. The certificate revocation method according to claim 13, wherein each entry of the certificate revocation list comprises an index of a node of the key tree, the derived secret key corresponding to the node, and a height of the node.

15. A certificate verification method, performed by anon-board unit having a processor, the certificate verification method comprising:
- receiving a message comprising a certificate from an entity, and receiving a certificate revocation list which comprises at least one derived secret key from a certificate authorization device by the processor, wherein the entity-provides an authentication to the on-board unit receiving the message by attaching the certificate to the message, wherein the certificate is one of a plurality of certificates generated by the certificate authorization device, and the generated certificates are received by the entity from the certificate authorization device;
- determining whether the certificate is revoked by comparing the certificate with the certificate revocation list by the processor; and
- accepting the message if the certificate is not revoked, and disregarding the message if the certificate is revoked by the processor,
- wherein the plurality of certificates correspond to a plurality of leaves of a key tree, where in the key tree comprises a root and a plurality of sub-nodes;
  - wherein two derived secret keys of two of the sub-nodes are respectively generated by a derived secret key of the root and two randomly selected hash functions of the hash function set,
  - wherein two derived secret keys of two child nodes among the sub-nodes other than the said two of the sub-nodes are respectively generated by a derived secret key of a parent node of the said two child nodes and randomly selected hash functions of the hash function set,
  - wherein the plurality of leaves of the key tree are a plurality of nodes which do not have any child node, among the sub-nodes,
  - wherein the at least one derived secret key is at least one root of a minimum number of sub-trees of the key tree, wherein all the leaves of the sub-trees are corresponding to all the revoked certificates of the plurality of certificates.

16. The certificate verification method according to claim 15, further comprising:
- determining whether an index in the certificate is covered in the certificate revocation list:
- when the index is not covered in the certificate revocation list, the certificate is indicated valid and the message is accepted; and
- when the index is covered in the certificate revocation list, comparing the derived secret key in the certificate with a hashed value of the derived secret key in the certification revocation list hashed by at least one hash function indicated in the certificate, and if the derived secret key in the certificate matches the hashed value, the certificate is revoked and the message is disregarded.

17. The certificate verification method according to claim 15, wherein each entry of the certificate revocation list comprises an index of a node of the key tree, a derived secret key corresponding to the node, and a height of the node;
- wherein the certificate comprises the derived secret key corresponding to a leaf node of the key tree, the index of the leaf node, a public key of a public/private key pairs of the entity, a certificate authority signature, and at least one index of at least one randomly selected hash function of the hash function set.

* * * * *